(12) United States Patent
Hadano et al.

(10) Patent No.: US 11,154,952 B2
(45) Date of Patent: Oct. 26, 2021

(54) LASER PROCESSING APPARATUS

(71) Applicant: DISCO CORPORATION, Tokyo (JP)

(72) Inventors: Yuji Hadano, Tokyo (JP); Keiji Nomaru, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 230 days.

(21) Appl. No.: 16/438,717

(22) Filed: Jun. 12, 2019

(65) Prior Publication Data
US 2019/0381609 A1    Dec. 19, 2019

(30) Foreign Application Priority Data

Jun. 19, 2018   (JP) .............................. JP2018-116014

(51) Int. Cl.
*B23K 26/402*    (2014.01)
*B23K 26/12*     (2014.01)
(Continued)

(52) U.S. Cl.
CPC ............ *B23K 26/402* (2013.01); *B23K 26/04* (2013.01); *B23K 26/127* (2013.01);
(Continued)

(58) Field of Classification Search
CPC ................ B23K 26/402; B23K 26/146; B23K 26/1462; B23K 26/04; B23K 26/127; B23K 26/16; B23K 26/389; B23K 26/40; B23K 26/38; B23K 26/032; B23K 26/1224; B23K 26/0622; B23K 26/0853; B23K 26/1476; B23K 26/0665; B23K 26/082; B23K 26/142; B23K 26/0006; B23K 26/03; B23K 26/064; B23K 26/0643; B23K 26/08; B23K 26/364; B23K 26/388; B23K 26/53;
(Continued)

(56) References Cited

U.S. PATENT DOCUMENTS 5,786,561 A * 7/1998 Zefferer .............. B23K 26/123
                                                      219/121.67
5,938,594 A *  8/1999 Poon ...................... G06F 17/18
                                                      600/300
(Continued)

FOREIGN PATENT DOCUMENTS

JP           10305420 A       11/1998
JP        2002192370 A         7/2002
(Continued)

*Primary Examiner* — Ibrahime A Abraham
*Assistant Examiner* — Chris Q Liu
(74) *Attorney, Agent, or Firm* — Greer Burns & Crain, Ltd.

(57) ABSTRACT

A laser processing apparatus includes a laser beam applying unit having a focusing unit applying a laser beam to a workpiece held on a chuck table, a feeding mechanism relatively moving the chuck table and the laser beam applying unit, and a chamber having a top wall connected to the focusing unit and a side wall connected to the top wall to define an enclosed space, the top wall having a transparent plate located directly below the focusing unit and allowing the pass of the laser beam applied from the focusing unit. The laser processing apparatus further includes a liquid supplying unit supplying a liquid into the enclosed space to make a condition that the enclosed space is filled with the liquid under a predetermined pressure.

14 Claims, 5 Drawing Sheets

(51) Int. Cl.
*B23K 26/146* (2014.01)
*B23K 26/16* (2006.01)
*B23K 26/04* (2014.01)
*B23K 26/14* (2014.01)
*B23K 103/00* (2006.01)

(52) U.S. Cl.
CPC ........ *B23K 26/146* (2015.10); *B23K 26/1462* (2015.10); *B23K 26/16* (2013.01); *B23K 2103/56* (2018.08)

(58) Field of Classification Search
CPC ................ B23K 26/702; B23K 26/042; B23K 26/0821; B23K 26/0869; B23K 26/0876; B23K 26/1494; B23K 26/703; B23K 26/009; B23K 26/0093; B23K 26/02; B23K 26/034; B23K 26/043; B23K 26/0626; B23K 26/0648; B23K 26/067; B23K 26/0673; B23K 26/0676; B23K 26/0823; B23K 26/083; B23K 26/122; B23K 26/123; B23K 26/128; B23K 26/1436; B23K 26/1438; B23K 26/147; B23K 26/1482; B23K 26/1488; B23K 26/18; B23K 26/354; B23K 26/36; B23K 26/361; B23K 26/382; B23K 26/705
USPC .............. 219/121.84, 121.71, 121.7, 121.72, 219/121.67, 121.69, 121.6, 121.78, 219/121.83, 121.85, 121.86
See application file for complete search history.

(56) References Cited

U.S. PATENT DOCUMENTS

| | | | | |
|---|---|---|---|---|
| 5,977,515 | A * | 11/1999 | Uraki | B23K 26/067 219/121.84 |
| 7,514,015 | B2 * | 4/2009 | Elliott | B08B 7/0042 156/345.5 |
| 8,785,814 | B1 * | 7/2014 | Toller | B23K 26/142 219/121.72 |
| 2002/0106418 | A1 * | 8/2002 | Fukushima | B23K 26/146 425/467 |
| 2005/0109745 | A1 * | 5/2005 | Wessner | B23K 26/0643 219/121.84 |
| 2007/0084839 | A1 * | 4/2007 | Zhang | B23K 26/146 219/121.84 |
| 2011/0042362 | A1 * | 2/2011 | Maehara | B23K 26/146 219/121.67 |
| 2012/0298649 | A1 * | 11/2012 | Nagata | B23K 26/16 219/243 |
| 2013/0256277 | A1 * | 10/2013 | Li | B23K 26/14 219/74 |
| 2016/0083815 | A1 * | 3/2016 | Glaser | B23K 26/03 72/56 |
| 2017/0232558 | A1 * | 8/2017 | Kano | B23K 26/0861 219/121.72 |
| 2018/0009063 | A1 * | 1/2018 | Ogura | B23K 26/16 |

FOREIGN PATENT DOCUMENTS

JP 2004188475 A 7/2004
JP 2014221483 A 11/2014

* cited by examiner

LASER PROCESSING APPARATUS

BACKGROUND OF THE INVENTION

Field of the Invention

The present invention relates to a laser processing apparatus for applying a laser beam to a plate-shaped workpiece to process the workplace.

Description of the Related Art

A plurality of devices such as integrated circuits (ICs) and large scale integrations (LSIs) are formed on the front side of a wafer so as to be separated by a plurality of crossing division lines. The wafer thus having the plural devices on the front side is divided along the division lines by using a laser processing apparatus to obtain a plurality of individual device chips respectively including the plural devices. These device chips are used in various electrical equipment such as mobile phones, personal computers, and illumination equipment.

There are various types of laser processing methods using a laser processing apparatus. For example, the following types (1), (2), and (3) are known in the art.

(1) A laser beam having an absorption wavelength to a workpiece is applied to the workpiece in the condition where the focal point of the laser beam is set on the front side (upper surfaces of the workplace, thereby performing ablation to form a groove as a division start point on the front side of the workpiece along each division line (see Japanese Patent Laid-open No. Hei 10-305420, for example).

(2) A laser beam having a transmission wavelength to a workpiece is applied to the workpiece in the condition where the focal point of the laser beam is set inside the workpiece, thereby forming a modified layer as a division start point inside the workpiece along each division line (see Japanese Patent No. 3408805, for example).

(3) A laser beam having a transmission wavelength to a workpiece is applied to the workpiece in the condition where the focal point of the laser beam, is set at a predetermined position inside the workpiece, thereby forming a plurality of shield tunnels as a division start point in the workpiece along each division line, in which each shield tunnel is composed of a fine hole and an amorphous region formed around the fine hole for shielding the fine hole, and the fine hole extends from the front side of the workpiece to the back side thereof (see Japanese Patent Laid-open No. 2014-221483, for example).

Any one of these laser processing methods is suitably selected according to the kind of the workpiece and the processing accuracy demanded, for example.

In the above-mentioned type (1) that ablation is performed, debris (laser processing dust) is generated in applying the laser beam to the front side of the workpiece (wafer), and this debris scatters and adheres to the front side of each device formed on the front side of the wafer, causing a possible degradation in quality of each device. To cope with this problem, the following method has been proposed. That is, a liquid resin allowing the transmission of the laser beams is to be used for processing is previously applied to the front side of the wafer prior to performing the laser processing, thereby preventing the adherence of the debris to the front side of the wafer. After performing the laser processing, the liquid resin (resin film) is removed (see Japanese Patent Laid-Open No. 2004-188475, for example).

SUMMARY OF THE INVENTION

According to the technique described in Japanese Patent Laid-Open No. 2004-188475, the adherence of the debris to the front side of each device can be prevented by the liquid resin (resin film) applied to the front side of the wafer, so that the quality of each device can be ensured. However, it is necessary to perform a step of applying the liquid, resin before performing the laser processing and a step of removing the liquid resin after performing the laser processing. Accordingly, there is a problem in productivity. Furthermore, the liquid resin cannot be repeatedly used. Accordingly, there is another problem in economy. That is, the liquid resin causes poor economy.

Further, another method may be such that the wafer is immersed in water before performing the laser processing and the debris generated by the application of the laser beam, is allowed to float in the water, thereby preventing the adherence of the debris to the front side of the wafer. However, fine bubbles are generated in the water by the application of the laser beam, and the laser beam is hindered by the fine bubbles in processing the wafer, so that desired laser processing cannot be performed.

It is therefore an object of the present invention to provide a laser processing apparatus which can prevent the hindrance of the application, of the laser beam to the workpiece due to the bubbles generated in performing laser processing to the workpiece.

In accordance with an aspect of the present invention, there is provided a laser processing apparatus including: a chuck table holding a plate-shaped workpiece; a laser beam applying unit having focusing means applying a laser beam, to the workpiece held on the chuck table; feeding means relatively moving the chuck table and the laser beam applying unit in a feeding direction; a chamber having a top wall connected to the focusing means and a side wall connected to the top wall to define an enclosed space, the top wall having a transparent plate located directly below the focusing means and allowing pass of the laser beam applied from the focusing means, the side wall having an inlet opening introducing a liquid into the enclosed space and an outlet opening displaying the liquid out of the enclosed space, the side wall being located above the chuck table with a spacing defined between a lower surface of the side wall and an upper surface of the workpiece held on the chuck table; and liquid supplying means supplying the liquid into the enclosed space of the chamber to make a condition that the enclosed space is filled with the liquid under a predetermined pressure and that the liquid discharged from the outlet opening of the chamber is allowed to flow through the spacing, thereby compressing bubbles generated in the liquid by the application of the laser beam to the workpiece.

Preferably, the laser beam applying unit includes dispersing means dispersing the laser beam in the feeding direction before applying the laser beam from the focusing means. Preferably, the pressure in the enclosed space of the chamber is maintained at 6 to 10 atm.

According to the present invention, the fine bubbles generated in the liquid by the application of the laser beam can be compressed by the high pressure in the enclosed space of the chamber, so that there is no possibility that the application of the laser beam to the workpiece may be hindered by the fine bubbles. Further, in the case of performing ablation, by using the laser processing apparatus, it is unnecessary to coat the front side of a wafer as the workpiece with a liquid resin, and the debris generated in laser processing can be prevented from adhering to each device formed on the front side of the wafer. Accordingly, a degradation in quality of each device can be prevented.

The above and other objects, features and advantages of the present invention and the manner of realizing them will become more apparent, and the invention itself will best be understood from a study of the following description and appended claims with reference to the attached drawings showing a preferred embodiment of the invention.

DETAILED DESCRIPTION OF THE PREFERRED EMBODIMENT

Figure 1:
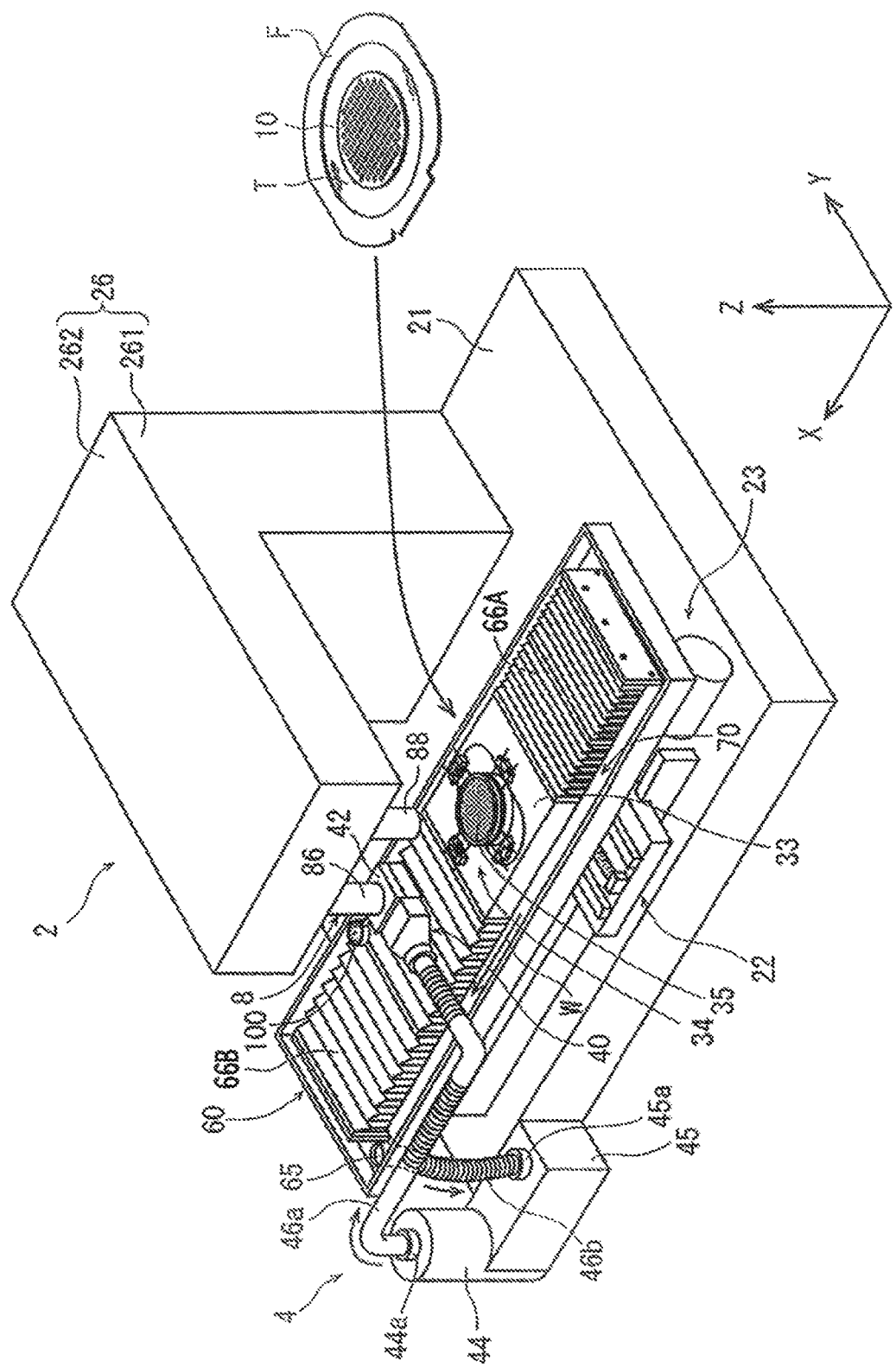
FIG. 1 is a perspective view of a laser processing apparatus according to a preferred embodiment of the present invention.

A laser processing apparatus according to a preferred embodiment of the present invention will now be described in detail with reference to the attached drawings. FIG. 1 is a perspective view of a laser processing apparatus 2 according to this preferred embodiment. The laser processing apparatus 2 includes a base 2, a holding unit 22 provided on the base 21 for holding a circular plate-shaped workpiece (e.g., wafer 10 formed of silicon), a moving mechanism 23 for moving the holding unit 22, an inverted L-shaped support member 26 composed of a vertical portion 261 extending upward from an upper surface of the base 21 in a Z direction depicted by an arrow Z in FIG. 1 at a position behind the moving mechanism 23 and a horizontal portion 262 extending horizontally from an upper end of the vertical portion 261 toward a position above the holding unit 22, a liquid supply mechanism 4, and a laser beam applying unit 8. As depicted in FIG. 1, the wafer 10 is supported through an adhesive tape T to an annular frame F. In actual, the laser processing apparatus 2 is wholly covered with a housing or the like not depicted for convenience of illustration, in which the housing is so configured as to prevent the entry of dust, or the like into the inside space.

Figure 2:
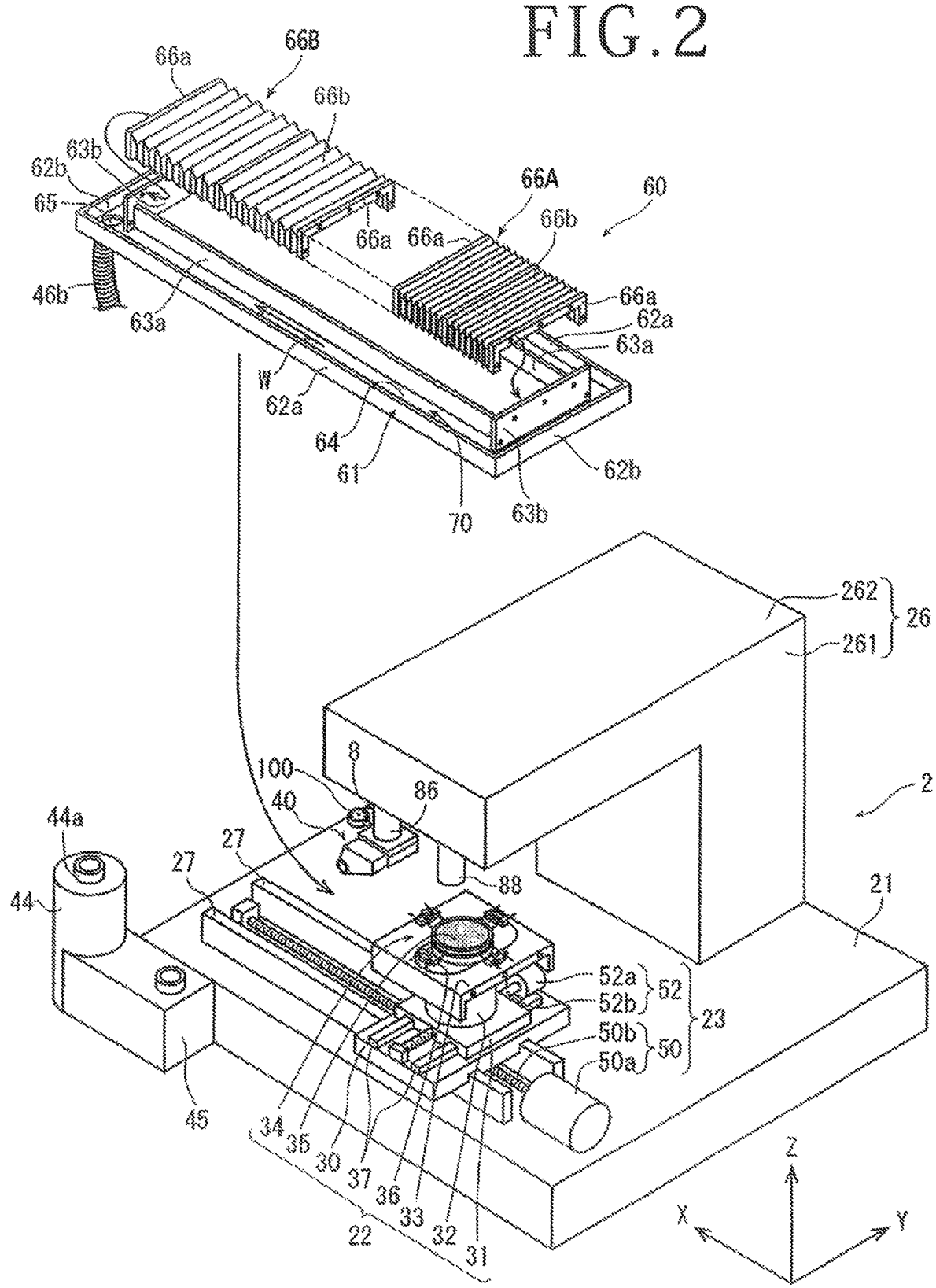
FIG. 2 is an exploded perspective, view of the laser processing apparatus depicted in FIG. 1, in which a part of the laser processing apparatus is separated.

FIG. 2 is an exploded perspective view of the laser processing apparatus 2 depicted in FIG. 1, in which a liquid recovery pool 60 as a part of the liquid supply mechanism 4 is removed from the laser processing apparatus 2 and depicted in exploded perspective.

The laser processing apparatus 2 will now be described in more detail with reference to FIG. 2. The laser beam applying unit 8 functions to apply a laser beam to the wafer 10 held by the holding unit 22. The laser beam applying unit 8 includes an optical system provided in the horizontal portion 262 of the support member 26. Focusing means 86 as a part of the laser beam, applying unit 8 is provided on a lower surface of the horizontal portion 262 at a front end portion thereof. Further, alignment means 88 is also provided on the lower surface of the horizontal portion 262 at a position adjacent to the focusing means 86 in an X direction depicted by an arrow X in FIG. 2.

The alignment means 88 includes an imaging element (charge-coupled device (CCD)) using visible light for imaging the front side of the wafer 10. As a modification, according to the material of the wafer 10, the alignment means 88 may include infrared light applying means for applying infrared light to the wafer 10, an optical system for capturing the infrared light applied by the infrared light applying means, and an imaging element (infrared CCD) for outputting an electrical signal corresponding to the infrared light captured by the optical system.

The holding unit 22 includes a rectangular X movable plate 30 mounted on the base 21 so as to be movable in the X direction, a rectangular movable plate 31 mounted on the X movable plate 30 so as to be movable in a Y direction depicted by an arrow Y in FIG. 2, the Y direction being perpendicular to the X direction in a horizontal plane, a cylindrical support 32 fixed to an upper surface of the Y movable plate 31, and a rectangular cover plate 33 fixed to an upper surface of the cylindrical support 32. The cover plate 33 has an elongated hole and a chuck table 34 is provided on the upper end of the cylindrical support 32 so as to extend through the elongated hole of the cover plate 33. The chuck table 34 is so configured as to hold the wafer 10 thereon, and is rotatable about its vertical axis by rotational drive means (not depicted). The chuck table 34 has an upper surface provided with a circular vacuum chuck 35 having a substantially horizontal upper surface. The vacuum chuck 35 is formed of a porous material. The wafer 10 is adapted to be held on the upper surface of the vacuum chuck 35 under suction. The vacuum chuck 35 is connected through a suction passage (not depicted) to suction means (vacuum source) (not depicted), in which this suction passage is formed in the cylindrical support 32. Four clamps 36 are provided around the vacuum chuck 35 so as to be arranged at equal intervals in the circumferential direction of the chuck table 34. In fixing the wafer 10 to the chuck table 34, the annular frame F supporting the wafer 10 through the adhesive tape T is clamped by the four clamps 36.

The moving mechanism 23 includes an X moving mechanism 50 and a Y moving mechanism 52. The X moving mechanism 50 includes a motor 50a and a ball screw 50b extending in the X direction and adapted to be rotated by the motor 50a, in which the ball screw 50b has a nut portion fixed to the X movable plate 30. Accordingly, a rotary motion of the motor 50a is converted into a linear motion of the nut portion in the X direction by the ball screw 50b, and this linear motion is transmitted to the X movable plate 30, so that the X movable plate 30 can be moved in the X direction along a pair of parallel guide rails 27 provided on the base 21. That is, the X movable plate 30 is slidably mounted on the pair of parallel guide rails 27 extending in the X direction. Similarly, the Y moving mechanism 52 includes a motor 52a and a ball screw 52b extending in the Y direction and adapted to be rotated by the motor 52a, in which the ball screw 52b has a nut portion fixed to the Y movable plate 31.

Accordingly, a rotary motion of the motor 52a is converted into a linear motion of the nut portion in the Y direction by the ball screw 52b, and this linear motion is transmitted to the Y movable plate 31, so that the Y movable plate 31 can be moved in the Y direction along a pair of parallel guide rails 37 provided on the X movable plate 30. That is, the Y movable plate 31 is slidably mounted on the pair of parallel guide rails 37 extending in the Y direction. Thus, the chuck table 34 can be moved both in the X direction and in the Y direction by operating the X moving mechanism 50 and the Y moving mechanism 52. Although not depicted, the X moving mechanism 50 is provided with X position detecting means for detecting the X position of the chuck table 34 in the X direction, and the Y moving mechanism 52 is provided with Y position detecting means for detecting the Y position of the chuck table 34 in the Y direction. Further, the rotational drive means (not depicted) for rotating the chuck table 34 is provided with rotational position detecting means for detecting the rotational position of the chuck table 34. Accordingly, the X moving mechanism 50, the Y moving mechanism 52, and the rotational drive means are operated according to the results of detection by the X position detecting means, the Y position detecting means, and the rotational position detecting means, so that the chuck table 34 can be accurately moved to an arbitrary X position and an arbitrary Y position and rotated by an arbitrary angle. The X moving mechanism 50 corresponds to feeding means for relatively moving the holding unit 22 and the laser beam applying unit 8 in a feeding direction (X direction). In this preferred embodiment, the holding unit 22 is moved in the feeding direction relative to the laser beam applying unit 8 by the X moving mechanism 50. The Y moving mechanism 52 corresponds to indexing means for relatively moving the holding unit 22 and the laser beam applying unit 8 in an indexing direction (Y direction). In this preferred embodiment, the holding unit 22 is moved in the indexing direction relative to the laser beam applying unit 8 by the Y moving mechanism 52.

The liquid supply mechanism 4 will now be described in more detail with reference to FIGS. 1 to 3B. As depicted in FIG. 1, the liquid supply mechanism 4 includes a liquid injection unit 40, a liquid supply pump 44, a liquid filter unit 45, a liquid recovery pool 60, a first pipe 46a for connecting the liquid supply pump 44 to the liquid injection unit 40, and a second pipe 46b for connecting the liquid recovery pool 60 to the liquid filter unit 45. The first pipe 46a and the second pipe 46b may be flexible hoses, in which a part or the whole of each flexible hose may be flexible.

Figure 3A:
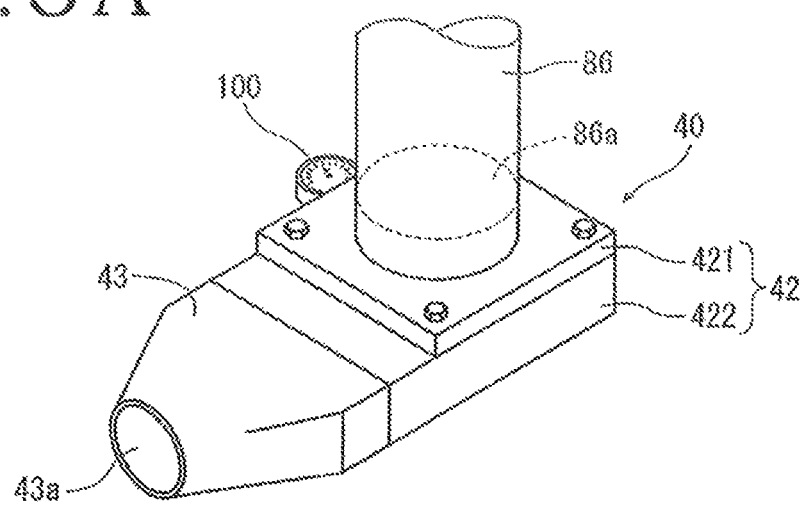
FIG. 3A is a perspective view of a liquid injection unit included in the laser processing apparatus depicted in FIG. 1.
Figure 3B:
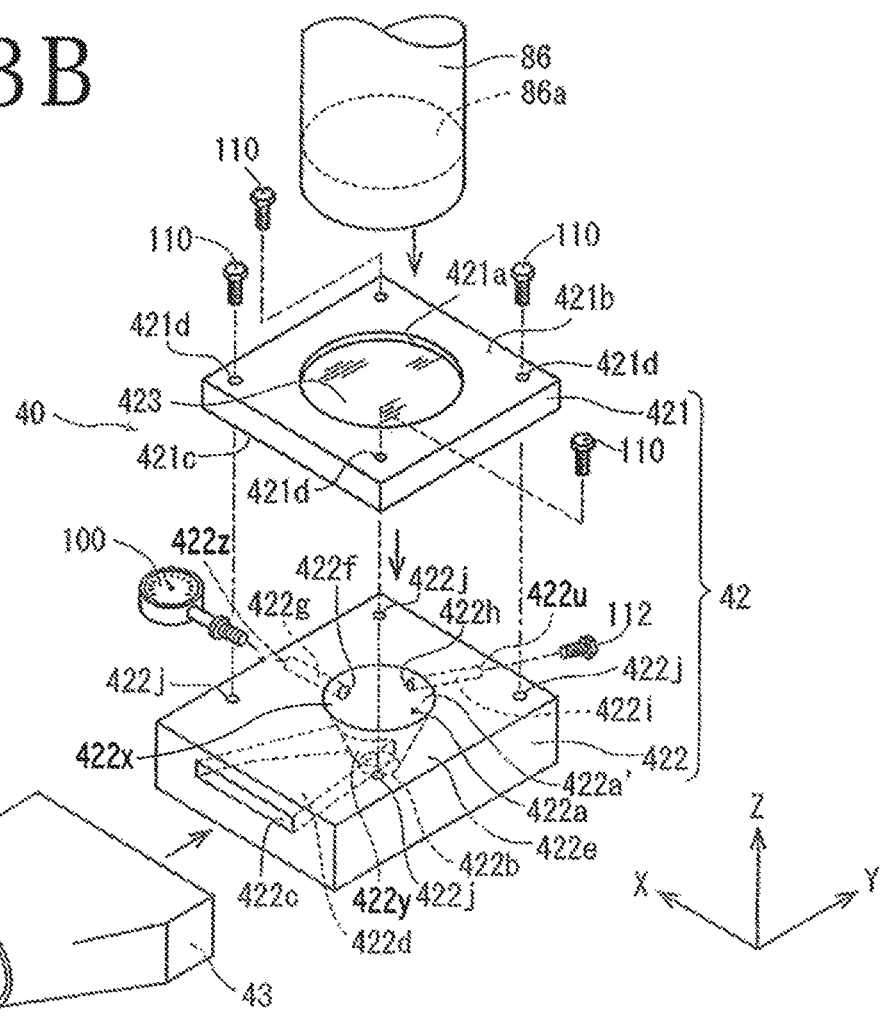
FIG. 3B is an exploded perspective view of the liquid injection unit depicted in FIG. 3A.

As depicted in FIG. 3A, the liquid injection unit 40 is connected to a lower end portion of the focusing means 86. FIG. 3B is an exploded perspective view of the liquid injection unit 40 depicted in FIG. 3A. As depicted in FIG. 3B, the liquid injection unit 40 includes a housing 42, a liquid supply nozzle 43, and a pressure gauge 100. The housing 42 is substantially rectangular in plan, and it is composed of a rectangular upper member 421 and a rectangular lower member 422 connected to the upper member 421. The upper member 421 has a circular central opening 421a for connecting the focusing means 86. That is, the lower end portion of the focusing means 86 is engaged with the opening 421a of the upper member 421. A lower end of the opening 421a is closed by a circular transparent plate 423 allowing the pass of a laser beam LB applied from the focusing means 86. The transparent plate 423 is a glass plate, for example. A lower surface of the transparent plate 423 mounted on the upper member 421 so as to close the lower end of the opening 421a is flush with the lower surface 421c of the upper member 421 (see also FIGS. 5A and 5B).

The lower member 422 is formed with a chamber 422a extending from an upper surface of the lower member 422 to a lower surface thereof. That is, the chamber 422a has a circular upper opening 422x opening to the upper surface of the lower member 422 and a circular lower opening 422b opening to the lower surface of the lower member 422. The chamber 422a has an inverted frustoconical shape so as to be surrounded by a side wall 422e. That is, the diameter of the lower opening 422b of the chamber 422a is smaller than the diameter of the upper opening 422x. The lower member 422 is further formed with a liquid supply passage 422d for supplying a liquid W from the liquid supply nozzle 43 to the chamber 422a. More specifically, the side wall 422e of the lower member 422 has four side surfaces, and one of the four side surfaces is formed with an inlet opening 422c for introducing the liquid W to the chamber 422a. Further, the chamber 422a has a conical surface 422a', and the conical surface 422a' of the chamber 422a is formed with an outlet opening 422y for discharging the liquid W into the chamber 422a. Accordingly, the liquid supply passage 422d formed in the side wall 422e of the lower member 422 extends from the inlet opening 422c to the outlet opening 422y. The lower member 422 is further formed with a pressure detection passage 422g for detecting the pressure inside the chamber 422a. More specifically, the conical surface 422a' of the chamber 422a is further formed with an opening 422f, and another side surface of the side wall 422e is formed with an opening 422z. The pressure detection passage 422g formed in the side wall 422e of the lower member 422 extends from the opening 422f opening to the conical surface 422a' of the chamber 422a to the opening 422z opening to the side surface of the side wall 422e. The pressure gauge 100 is mounted in the pressure detection passage 422g so as to close the opening 422z. Accordingly, the pressure inside the chamber 422a can be detected by the pressure gauge 100 through the pressure detection passage 422g. The lower member 422 is further formed with an air removing passage 422i for removing the air from the chamber 422a. More specifically, the conical surface 422a' of the chamber 422a is formed with an opening 422h at an upper position, and another side surface of the side wall 422e is formed with an opening 422u. The air removing passage 422i formed in the side wall 422e of the lower member 422 extends from the opening 422h opening to the conical surface 422a' of the chamber 422a to the opening 422u opening to the side surface of the side wall 422e. The opening 422u of the air removing passage 422i is closed by a screw 112 as required.

The upper member 421 corresponds to a top wall including the transparent plate 423 for closing the upper opening 422x of the chamber 422a. Four through holes 421d are formed at the four corner portions of the upper member 421, and four tapped holes 422j are formed on the upper surface of the lower member 422 at the four positions corresponding to the four through holes 421d of the upper member 421. The upper member 421 is fixed to the upper surface of the lower member 422 by inserting four screws 110 through the four through holes 421d of the upper member 421 and then engaging the four screws 110 into the four tapped holes 422j of the lower member 422. Accordingly, the side wall 422e of the lower member 422 is connected to the upper member 421 forming the top wall of the chamber 422a so as to depend from the upper member 421. The liquid supply nozzle 43 is connected to one side surface of the lower member 422 where the inlet opening 422c is formed. Thus, the liquid injection unit 40 including the housing 42 and the liquid supply nozzle 43 is formed.

The liquid supply nozzle 43 has an inlet opening 43a for introducing the liquid W supplied from the liquid supply pump 44 and an outlet opening 43b (see FIG. 5B) connected to the inlet opening 422c of the lower member 422. Further, a liquid supply passage 43c (see FIG. 5B) is formed inside the liquid supply nozzle 43 so as to extend from the inlet opening 43a to the outlet opening 43b. Accordingly, the liquid W discharged from the liquid supply pump 44 is supplied to the inlet opening 43a of the liquid supply nozzle 43 and further supplied through the liquid supply passage 43c to the outlet opening 43b. The liquid W is next allowed to enter the liquid supply passage 422d of the lower member 422 from the inlet opening 422c and then enter the chamber 422a. Finally, the liquid W is discharged from the lower opening 422b of the lower member 422.

The liquid recovery pool 60 will now be described with reference to FIGS. 1 and 2. As depicted in FIG. 2, the liquid recovery pool 60 includes a rectangular ring-shaped frame 61 like a gutter and a pair of first and second waterproof covers 66A and 66B mounted on the frame 61. The frame 61 includes a pair of parallel first outer walls 62a extending in the X direction, a pair of parallel second outer walls 62b extending in the Y direction, a pair of parallel first inner walls 63a extending in the X direction so as to be spaced a given distance from the first outer walls 62a, a pair of parallel second inner walls 63b extending in the Y direction so as to be spaced a given distance from the second outer walls 62b, and a bottom wall 64 for connecting lower ends of the first and second outer walls 62a and 62b to the lower ends of the first and second inner walls 63a and 63b. The first outer walls 62a are longer than the second outer walls 62b, and the first inner walls 63a are longer than the second inner walls 63b. Accordingly, a rectangular ring-shaped liquid recovery passage (groove) 70 is formed by the first and second outer walls 62a and 62b, the first and second inner walls 63a and 63b, and the bottom wall 64 in such a manner that the first outer walls 62a and the first inner walls 63a extend in the X direction and the second outer walls 62b and the second inner walls 63b extend in the Y direction.

A rectangular inside opening 60A is defined inside the first and second inner walls 63a and 63b. The bottom wall 64 constituting the liquid recovery passage 70 is slightly inclined both in the X direction and in the Y direction in such a manner that one of the four corner portions of the liquid recovery passage 70 is lowest in level (e.g., a left front corner portion in FIG. 2). At this lowest position of the liquid recovery passage 70, a liquid discharge hole 65 is formed to collect the liquid W in the liquid recovery passage 70. The second pipe 46b is connected to the liquid discharge hole 65.

Accordingly, the liquid recovery passage 70 is connected through the second pipe 46b to the liquid filter unit 45. The frame 61 is preferably formed from a stainless steel plate resistant to corrosion and rust.

Each of the first and second waterproof covers 66A and 66B includes a pair of inverted U-shaped brackets 66a and a bellows-shaped waterproof cover member 66b formed of resin. Each bracket 66a has a size capable of straddling the first inner walls 63a opposed to each other in the Y direction. The two brackets 66a of the first waterproof cover 66A are mounted on the opposite ends of the cover member 66b of the first waterproof cover 66A. Similarly, the two brackets 66a of the second waterproof cover 66B are mounted on the opposite ends of the cover member 66b of the second waterproof cover 66B. One of the two brackets 66a of the first waterproof cover 66A is fixed to one of the second inner walls 63b opposed to each other in the X direction. Similarly, one of the two brackets 66a of the second waterproof cover 66B is fixed to the other inner wall 63b. The liquid recovery pool 60 configured above is fixed to the upper surface of the base 21 by using any fixing means (not depicted). The cover plate 33 of the holding unit 22 is mounted between the other bracket 66a of the first waterproof cover 66A and the other bracket 66a of the second waterproof cover 66B. That is, the cover plate 33 is sandwiched between the first and second waterproof covers 66A and 66B in the X direction. The cover plate 33 has a pair of opposite end surfaces as mounting surfaces oriented in the X direction, in which each end surface has the same shape and size as those of each bracket 66a. That is, the cover plate 33 has a size capable of straddling the first inner walls 63a opposed to each other in the Y direction. After fixing the frame 61 of the liquid recovery pool 60 to the base 21, the cover plate 33 is mounted to the first and second waterproof covers 66A and 66B previously mounted to the frame 61.

With this configuration, the cover plate 33 can be moved in the X direction by the X moving mechanism 50 so as to be guided along the first inner walls 63a of the liquid recovery pool 60. The mounting method for the first and second waterproof covers 66A and 66B and the cover plate 33 is not limited to the above. For example, before mounting the first and second waterproof covers 66A and 66B to the frame 61, the cover plate 33 may be previously mounted to the first and second waterproof covers 66A and 66B. The frame 61 may be previously mounted on the base 21, and the first and second waterproof covers 66A and 66B with the cover plate 33 may be next mounted to the frame 61.

Referring back to FIG. 1, the liquid W discharged from the liquid injection unit 40 is allowed to flow in the liquid recovery passage 70 of the liquid recovery pool 60 and is collected at the liquid discharge hole 65 formed at the lowest position of the liquid recovery passage 70. The liquid W collected at the liquid discharge hole 65 is guided through the second pipe 46b to the liquid filter unit 45. In the liquid filter unit 45, laser processing dust (debris) and any other dust contained in the liquid W is removed. Thereafter, the liquid W is returned to the liquid supply pump 44. In this manner, the liquid W supplied from the liquid supply pump 44 is circulated in the liquid supply mechanism 4.

Figure 4:
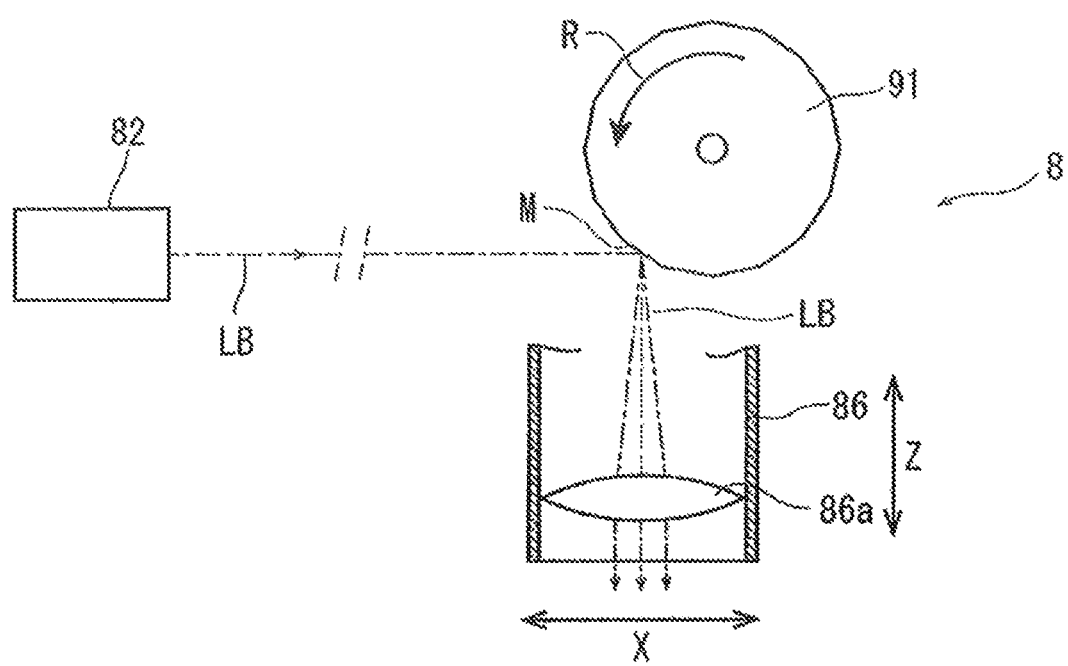
FIG. 4 is a block diagram for illustrating an optical system constituting a laser beam applying unit included in the laser processing apparatus depicted in FIG. 1.

FIG. 4 is a schematic block diagram depicting the optical system of the laser beam applying unit 8. As depicted in FIG. 4, the laser beam applying unit 8 includes a laser oscillator 82 oscillating a pulsed laser and outputting a pulsed laser beam LB, an attenuator (not depicted) for adjusting the power of the laser beam. LB generated from the laser oscillator 82, a reflecting mirror (not depicted) for suitably changing the optical path (traveling direction) of the laser beam LB generated from the laser oscillator 82, a polygon mirror 91 as dispersing means for dispersing a direction of application of the laser beam LB, and focusing means 86 for focusing the laser beam LB reflected by the polygon mirror 91. The laser oscillator 82 is so configured as to generate a laser beam LB having an absorption wavelength to the workpiece in this preferred embodiment.

The polygon mirror 91 is provided above the focusing means 86. The polygon mirror 91 is adapted to be rotated about its horizontal axis at a high speed in a direction depicted by an arrow R in FIG. 4 by a motor (not depicted). The focusing means 86 includes a focusing lens (fθ lens) 86a for focusing the laser beam LB reflected by the polygon mirror 91 and then applying the laser beam LB to the workplace. As depicted in FIG. 4, the polygon mirror 91 includes a plurality of mirrors M concentrically arranged about the rotation axis of the polygon mirror 91. That is, the plural mirrors M are so arranged as to form a regular polygon about the rotation axis of the polygon mirror 91 as viewed in side elevation. The fθ lens 86a is located below the polygon mirror 91 and functions to focus the laser beam LB reflected by the polygon mirror 91 toward the wafer 10 as the workpiece held on the chuck table 34. When the polygon mirror 91 is rotated, the direction of reflection of the laser beam LB reflected on each mirror M is changed in a predetermined range in the X direction. Accordingly, the laser beam LB reflected by the polygon mirror 91 is applied to the wafer 10 so as to be dispersed in the X direction (feeding direction) in the predetermined range (e.g., approximately 10 mm).

The laser beam applying unit 8 further includes focal position adjusting means (not depicted) for adjusting the focal position of the laser beam LB to be applied to the wafer 10. The focal position adjusting means may be so configured as to have a ball screw (not depicted) extending in the Z direction and a motor (not depicted) connected to one end of the ball screw, in which the ball screw has a nut portion fixed to the focusing means 86. The focal position adjusting means is operated in such a manner that the rotary motion of the motor is converted into a linear motion by the ball screw, and this linear motion is transmitted to the focusing means 86. Accordingly, the focusing means 86 can be moved in the Z direction along a guide rail (not depicted), so that the Z position of the focal point of the laser beam LB to be focused by the focusing means 86 can be adjusted.

The operation of the laser processing apparatus 2 configured above will now be described. First, the wafer 10 formed of silicon as a plate-shaped workpiece is prepared, in which the wafer 10 is previously supported through the adhesive tape T to the annular frame F in the condition where the front side of the wafer 10 is exposed as depicted in FIG. 1. A plurality of devices are previously formed, on the front side of the wafer 10 so as to be separated from each other by a plurality of crossing division lines. The plural crossing division lines are composed of a plurality of parallel division lines extending in a first direction and a plurality of parallel division lines extending in a second direction perpendicular to the first direction. Thereafter, the wafer 10 is placed on the vacuum chuck 35 of the chuck table 34 in the condition where the front side of the wafer 10 is oriented upward. Further, the annular frame F is fixed to the upper surface of the chuck table 34 by the clamps 36. Thereafter, the vacuum source connected to the vacuum chuck 35 is operated to produce a suction force on the vacuum chuck 35, thereby holding the wafer 10 on the vacuum chuck 35 under suction.

After holding the wafer 10 on the vacuum chuck 35 under suction as mentioned above, the moving mechanism 23 is operated to suitably move the chuck table 34 in the X direction, and the Y direction, thereby positioning the wafer 10 held on the chuck table 34 directly below the alignment means 88. Thereafter, the alignment means 88 is operated to image the front side of the wafer 10.

Thereafter, according to an image obtained by the alignment means 88, alignment is made between the wafer 10 and the focusing means 86 by using any technique such as pattern matching. According to information on position on the wafer 10 as obtained by this alignment, the chuck table 34 is moved to position the focusing means 86 directly above one end of a predetermined one of the division lines extending in the first direction, that is, directly above a start position where the laser beam LB starts to be applied to the wafer 10. Thereafter, the focal position adjusting means is operated to move the focusing means 86 in the Z direction, thereby adjusting the focus position of the focusing lens 86a in the Z direction, that is, positioning the focal point of the laser beam LB on the upper surface (front side) of the wafer 10 at the above-mentioned one end of the predetermined division line.

As described above, the liquid injection unit 40 of the liquid supply mechanism 4 is connected to the lower end of the focusing means 86. As apparent from FIG. 5A as a vertical sectional view of the liquid injection unit 40 as taken along the X direction, a spacing S of approximately 0.5 to 2.0 mm is defined between the lower surface of the side wall 422e forming the chamber 422a of the liquid injection unit 40 and the upper surface of the wafer 10 held on the chuck table 34, at the time of positioning the focal point of the laser beam LB on the upper surface (front side) of the wafer 10. In this preferred embodiment, the spacing S is preset to the above value at the time of positioning the focal point of the laser beam LB on the upper surface of the wafer 10. As a modification, the Z position of the liquid injection unit 40 and the X position of the focusing lens 86a may be separately adjusted. In this case, the adjustment of the focal point of the laser beam LB by the movement of the focusing lens 86a in the Z direction may be made separately from the adjustment of the spacing S by the movement of the liquid injection unit 40 in the Z direction.

After performing the alignment between the focusing means 86 and the wafer 10 by using the alignment means 88, a necessary and sufficient amount of liquid W is stored in the liquid supply mechanism 4 through the liquid recovery passage 70 of the liquid recovery pool 60 depicted in FIG. 1, and the liquid supply pump 44 is next operated. For example, pure water is used as the liquid W to be circulated in the liquid supply mechanism 4.

The liquid supply pump 44 has a discharge opening 44a connected to the first pipe 46a. The liquid W discharged from the discharge opening 44a of the liquid supply pump 44 is supplied through the first pipe 46a to the liquid injection unit 40. The liquid W supplied into the chamber 422a formed inside the housing 42 is discharged from the lower opening 422b of the chamber 422a. At this time, it is confirmed that the air left in the chamber 422a has been sufficiently removed through the air removing passage 422i formed in the side wall 422e. Thereafter, the air removing passage 422i is closed by the screw 112. The liquid W discharged from the lower opening 422b of the chamber 422a is allowed to flow in the liquid recovery passage 70 and is collected at the liquid discharge hole 65 formed at the lowest position in the liquid recovery passage 70. The liquid W collected at the liquid discharge hole 65 is guided through the second pipe 46b to the liquid filter unit 45. In the liquid filter unit 45, foreign matter including the debris is removed from the liquid W, and the liquid W thus cleaned is returned to the liquid supply pump 44. In this manner, the liquid W supplied by the liquid supply pump 44 is circulated in the liquid supply mechanism 4.

Further, the pressure in the chamber 422a can be checked at any time by an operator through the pressure gauge 100 connected to the chamber 422a. In this preferred embodiment, the pressure in the chamber 422a is maintained at 6 to 10 atm. In the case that a suitable discharge amount of the liquid W to be discharged from the liquid supply pump 44 and a suitable value for the spacing S are previously determined by experiment, the pressure gauge 100 is not always necessary. That is, in this case, it is unnecessary to check the pressure in the chamber 422a through the pressure gauge 100. Further, the liquid W discharged from the liquid injection unit 40 is allowed to flow through the narrow spacing S and next vigorously strike against the frame 61 forming the liquid recovery passage 70. Accordingly, the frame 61 may be provided with a guide member (not depicted) for receiving the liquid W vigorously discharged from the liquid injection unit 40 and guiding the liquid W to the liquid recovery passage 70 of the liquid recovery pool 60.

When a predetermined period of time (e.g., several minutes) has elapsed after starting the operation of the liquid supply mechanism 4, the chamber 422a is filled with the liquid W and the pressure in the chamber 422a is maintained at a desired high pressure (6 to 10 atm). As a result, the liquid W can be stably circulated in the liquid supply mechanism 4.

Figure 5A:
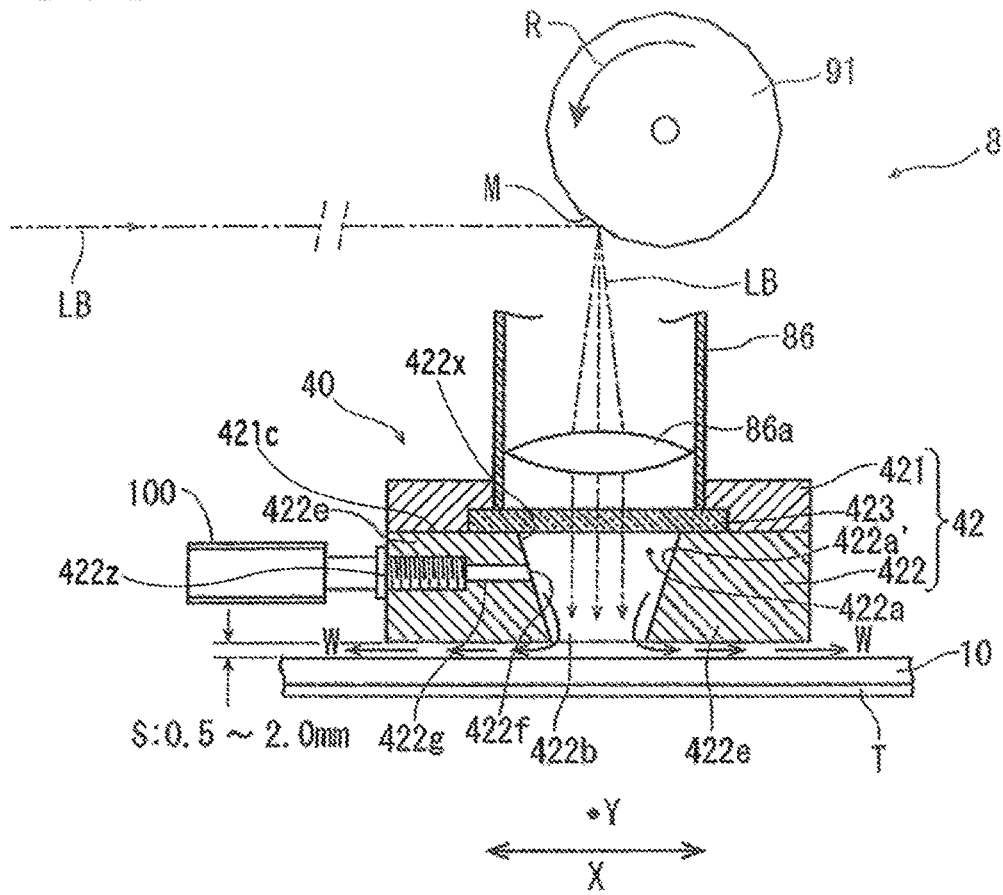
FIG. 5A is an enlarged sectional view of the liquid injection unit as taken along an X direction depicted by an arrow X, depicting the operation of the laser processing apparatus depicted in FIG. 1.
Figure 5B:
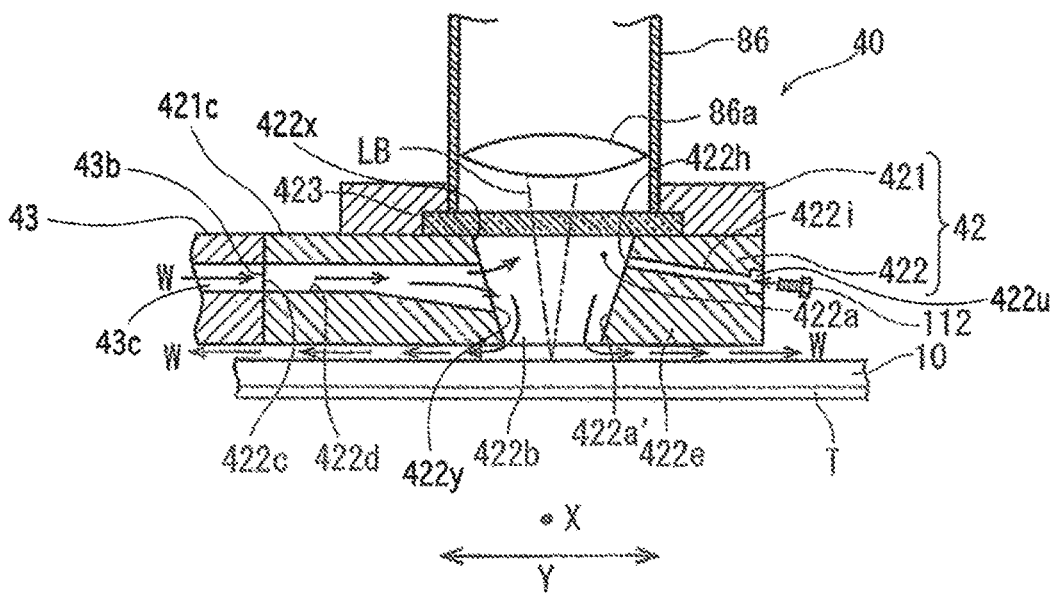
FIG. 5B is a view similar to FIG. 5A, depicting a cross section taken along a Y direction depicted by an arrow Y perpendicular: to the arrow X.

In the condition where the liquid W is stably circulated in the liquid supply mechanism 4 as mentioned above, the laser oscillator 82 in the laser beam applying unit 8 is operated to generate a laser beam LB. At the same time, the X moving mechanism 50 is operated to move the chuck table 34 in the feeding direction (X direction) at a predetermined feed speed. Thus, the laser beam LB is applied to the wafer 10 along the predetermined division line. At this time, as depicted in FIGS. 5A and 5B, the laser beam LB is focused by the focusing lens 86a of the focusing means 86 and applied through the transparent plate 423 of the liquid injection unit 40, the lower opening 422b of the chamber 422a, and the liquid W present in the spacing S to the upper surface of the wafer 10. At this time, the polygon mirror 91 is rotated, so that each mirror M composing the polygon mirror 91 is changed in position. As a result, the laser beam LB reflected by each mirror M is dispersed to be applied to the wafer 10. That is, the laser beam LB is scanned in the X direction. Such laser processing by the laser beam LB reflected by each mirror M is repeated while the laser beam LB is being generated from the laser oscillator 82 and the polygon mirror 91 is being rotated. The number of mirrors M composing the polygon mirror 91 and the rotational speed of the polygon mirror 91 may be suitably decided according to the workpiece.

For example, the laser processing by the laser processing apparatus 2 may be performed under the following conditions.

Wavelength of the laser beam: 226 nm, 355 nm, 532 nm, 1064 nm

Average power: 10 to 100 W

Repetition frequency: 10 to 300 MHz

Pulse width: 50 fs to 1 ns

Feed speed: 10 to 1000 mm/s

As depicted in FIGS. 5A and 5B, the laser beam LB is passed through the lower opening 422b of the chamber 422a of the housing 42 and then applied to the wafer 10. The diameter of the lower opening 422b is set to a value slightly larger than the range of dispersion of the laser beam LB in the feeding direction (e.g., approximately 10 mm). Accordingly, in dispersively applying the laser beam LB through the lower opening 422b to the wafer 10, the laser beam LB is not hindered by the lower opening 422b. Further, in applying the laser beam LB to an edge portion of the wafer 10, there is no possibility that the pressure in the chamber 422a may be rapidly decreased. Accordingly, ablation can be properly performed to the wafer 10.

In performing the ablation to the wafer 10, there is a possibility that fine bubbles may be generated at the position where the laser beam LB is applied to the front side of the wafer 10. However, in this preferred embodiment, the liquid M is always supplied from the liquid supply nozzle 43 into the chamber 422a to fill the chamber 422a with the liquid W. Furthermore, the pressure of the liquid W in the chamber 422a is maintained at a predetermined high pressure (6 to 10 atm). Accordingly, the fine bubbles generated in the vicinity of the position where the laser beam LB is applied to the wafer 10 are compressed to substantially disappear. As a result, the laser beam LB to be applied to the wafer 10 is not hindered by the fine bubbles generated in the liquid W in performing the ablation, thereby effecting the continuation of good ablation. Furthermore, in this preferred embodiment, the liquid W discharged from, the lower opening 422b of the chamber 422a is allowed to continuously flow in the spacing S defined between the upper surface of the wafer 10 and the lower surface of the housing 42. Accordingly, the debris released from the wafer 10 into the liquid W in performing the ablation can be quickly removed from the upper surface of the wafer 10. As apparent from FIG. 1, the liquid W containing the debris is allowed to flow on the cover plate 33 and the waterproof covers 66A and 66B and then, enter the liquid recovery passage 70. Thereafter, the liquid W is allowed to flow in the liquid recovery passage 70 and then reach the liquid discharge hole 65 formed at the lowest position of the liquid recovery passage 70. Thereafter, the liquid W is discharged from the liquid discharge hole 65 and then guided through the second pipe 46b to the liquid filter unit 45. After the liquid W is filtered in the liquid filter unit 45, the liquid W cleaned is returned to the liquid supply pump 44. In this manner, the liquid W is circulated in the liquid supply mechanism 4, in which any dust, including the debris is suitably removed from the liquid W to thereby maintain the liquid W in a clean condition.

After performing the ablation along the predetermined division line extending in the first direction made parallel to the X direction, the moving mechanism 23 is operated to move the chuck table 34, thereby positioning the focusing means 86 directly above one end of the next division line adjacent to the above predetermined division line in the Y direction.

Thereafter, the ablation is similarly performed along this next division line. In this manner, the ablation is similarly performed along all of the other division lines extending in the first direction. Thereafter, the chuck table 34 is rotated 90 degrees to make the other division lines extending in the second direction parallel to the X direction. Thereafter, the ablation is similarly performed along all the other division lines extending in the second direction. As a result, the ablation can be performed along all the crossing division lines extending in the first and second directions on the wafer 10 in the condition where the application of the laser beam LB to the wafer 10 is not hindered by the bubbles generated due to the ablation and the adherence of the debris to each device formed on the front side of the wafer 10 can also be prevented.

As described above, the liquid supply mechanism 4 includes the liquid supply pump 44 and the liquid filter unit 45 to circulate the liquid W in the liquid supply mechanism 4 in this preferred embodiment. However, such a configuration for circulating the liquid W is not always necessary in the liquid supply mechanism 4 according to the present invention. For example, in a plant where a plurality of processing apparatuses are installed, there is a case that a common liquid source is provided to supply the liquid W to all the processing apparatuses under the same conditions, and a common filter unit is provided to recover the liquid W used for the processing in all the processing apparatuses and then remove environmental pollutant from the liquid W. Further, a common liquid recovering path is provided in the plant in some case to return the liquid W to the common liquid source after removing the environmental pollutant.

Further, there is a case that the liquid W is discharged to the outside of the plant after removing the environmental pollutant from the liquid W in the common filter unit. In the case of installing the laser processing apparatus 2 according to this preferred embodiment in such a plant as mentioned above, the liquid supply mechanism 4 may exclude the liquid supply pump 44 and the liquid filter unit 45 to provide a simple configuration.

Further, while the transparent plate 423 is a glass plate in this preferred embodiment, the transparent plate 423 may be any transparent plate capable of transmitting the laser beam LB, such as an acrylic resin plate and any other transparent plastic plates.

Further, in the above preferred embodiment, the laser beam LB generated from the laser oscillator 82 is dispersed by the polygon mirror 91 and next guided to the focusing lens 86a. However, the polygon mirror 91 may be replaced by a reflecting mirror fixed in position. In this case, the laser beam LB reflected on the reflecting mirror is not dispersed toward the focusing lens 86a. Further, while the laser processing for the wafer 10 is ablation in the above preferred embodiment, the laser processing applicable in the present invention may also include laser processing for forming modified layers inside the workpiece (e.g., laser processing described in Japanese Patent No. 3408805) and laser processing for forming so-called shield tunnels inside the wafer (e.g., laser processing described in Japanese Patent Laid Open No. 2014-221483).

The present invention is not limited to the details of the above described preferred embodiment. The scope of the invention is defined by the appended claims and all changes and modifications as fall within the equivalence of the scope of the claims are therefore to be embraced by the invention.

What is claimed is:

1. A laser processing apparatus comprising:
a chuck table holding a plate-shaped workpiece;
a laser beam applying unit having focusing means applying a laser beam to said workpiece held on said chuck table;
feeding means relatively moving said chuck table and said laser beam applying unit in a feeding direction;
a chamber having a top wall connected to said focusing means and a side wall connected to said top wall to define an enclosed space, said top wall having a transparent plate located directly below said focusing means and allowing pass of said laser beam applied from said focusing means, said side wall having four side surfaces, a first side surface having an inlet opening configured for introducing a liquid into said enclosed space, a second side surface having a pressure detection passage configured for attaching to a pressure detector, a third side surface having an air removing passage for removing the air from the chamber, and an outlet opening located at a bottom of the chamber configured for discharging said liquid out of said enclosed space, said side wall being located above said chuck table with a spacing defined between a lower surface of said side wall and an upper surface of said workpiece held on said chuck table, wherein said lower surface of said side wall is a planar surface; and
liquid supplying means supplying said liquid into said enclosed space of said chamber to make a condition that said enclosed space is filled with said liquid under a predetermined pressure and that said liquid discharged from said outlet opening of said chamber is allowed to flow through said spacing between said planar surface and said uppers surface of said workpiece, thereby compressing bubbles generated in said liquid by the application of said laser beam to said workpiece.

2. The laser processing apparatus according to claim 1, wherein said laser beam applying unit includes dispersing means dispersing said laser beam in said feeding direction before applying said laser beam from said focusing means.

3. The laser processing apparatus according to claim 1, wherein the pressure in said enclosed space of said chamber is maintained at 6 to 10 atm.

4. The laser processing apparatus according to claim 1, wherein the pressure detection passage includes an opening in communication with the enclosed space of the chamber so that the pressure within the enclosed space can be detected by the pressure detector.

5. The laser processing apparatus according to claim 1, wherein said enclosed space of said chamber is of an inverted frustoconical shape that extends between an upper opening and said outlet opening, wherein a diameter of said outlet opening is smaller than a diameter of said upper opening.

6. The laser processing apparatus according to claim 1, wherein said liquid discharged from said outlet opening of said chamber flowing through said spacing between said planar surface and said upper surface of said workpiece flows in a radially outward direction, with respect to said outlet opening.

7. The laser processing apparatus according to claim 1, wherein said spacing defined between the lower surface of said side wall and the upper surface of said workpiece comprises an open area.

8. A laser processing apparatus comprising:
a chuck table holding a plate-shaped workpiece;
a laser beam applying unit having focusing means applying a laser beam to said workpiece held on said chuck table;
feeding means relatively moving said chuck table and said laser beam applying unit in a feeding direction;
a chamber having a top wall connected to said focusing means and a side wall connected to said top wall to define an enclosed space, said top wall having a transparent plate located directly below said focusing means and allowing pass of said laser beam applied from said focusing means, said side wall having four side surfaces, a first side surface having an inlet opening configured for introducing a liquid into said enclosed space, a second side surface having a pressure detection passage configured for attaching to a pressure detector, a third side surface having an air removing passage for removing the air from the chamber, and an outlet opening located at a bottom of the chamber configured for discharging said liquid out of said enclosed space, said side wall being located above said chuck table with a spacing defined between a lower surface of said side wall and an upper surface of said workpiece held on said chuck table, wherein said side wall of said chamber extends between an upper opening and said outlet opening, wherein a diameter of the lower opening is smaller than a diameter of the upper opening;
liquid supplying means supplying said liquid into said enclosed space of said chamber to make a condition that said enclosed space is filled with said liquid under a predetermined pressure and that said liquid discharged from said outlet opening of said chamber is allowed to flow through said spacing, thereby compressing bubbles generated in said liquid by the application of said laser beam to said workpiece; and an air removing passage for removing air from said enclosed space of said chamber, wherein said air removing passage extends from a first opening in said side wall of said chamber to a second opening on an exterior surface of said chamber, wherein said second opening is selectively closable.

9. The laser processing apparatus according to claim 8, wherein said laser beam applying unit includes dispersing means dispersing said laser beam in said feeding direction before applying said laser beam from said focusing means.

10. The laser processing apparatus according to claim 8, wherein the pressure in said enclosed space of said chamber is maintained at 6 to 10 atm.

11. The laser processing apparatus according to claim 8, further comprising a screw configured and arranged for selectively closing said second opening of said air removing passage.

12. The laser processing apparatus according to claim 4, wherein the pressure detection passage includes an opening in communication with the enclosed space of the chamber so that the pressure within the enclosed space can be detected by the pressure detector.

13. The laser processing apparatus according to claim 8, wherein said enclosed space of said chamber is of an inverted frustoconical shape.

14. The laser processing apparatus according to claim 8, wherein said spacing defined between the lower surface of said side wall and the upper surface of said workpiece comprises an open area.

* * * * *